Patented May 31, 1938

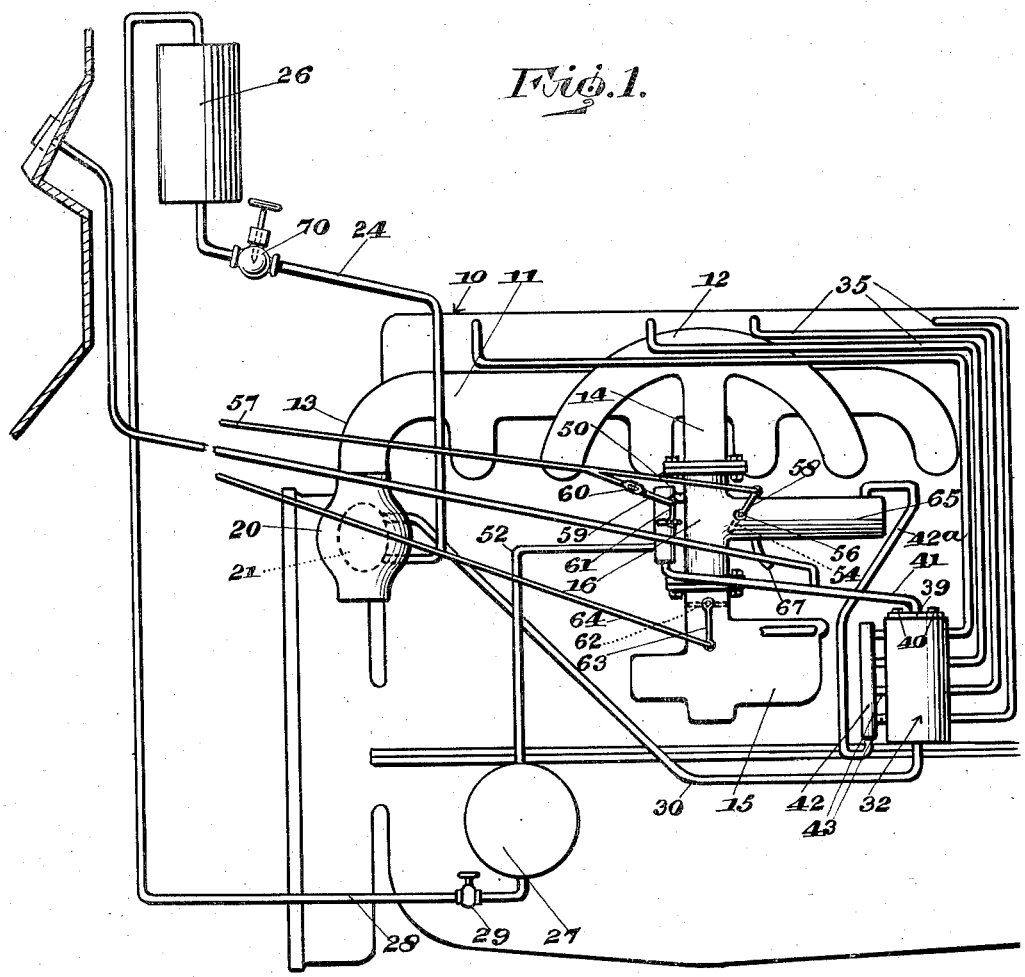

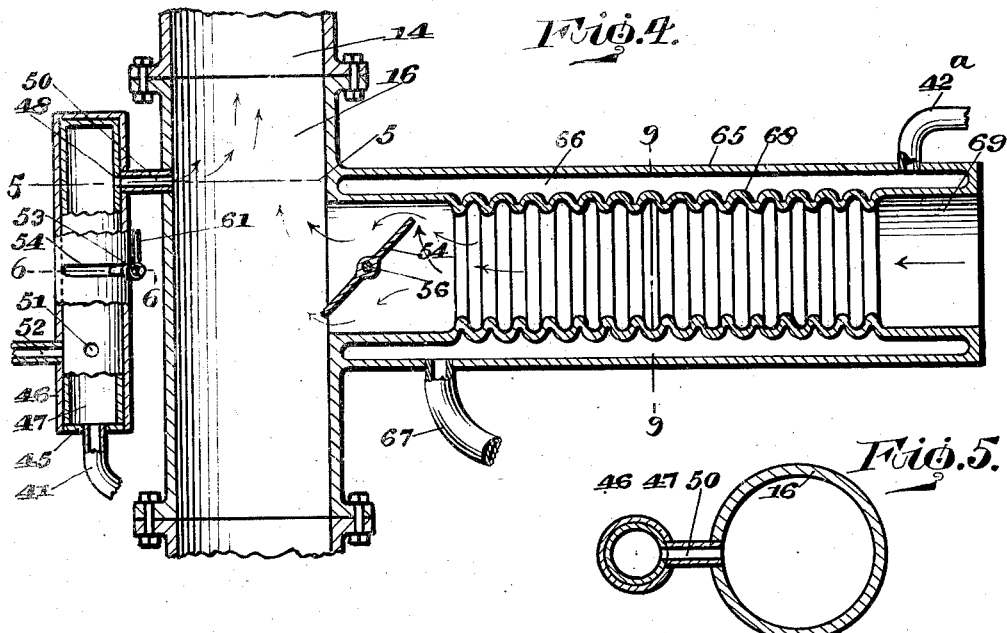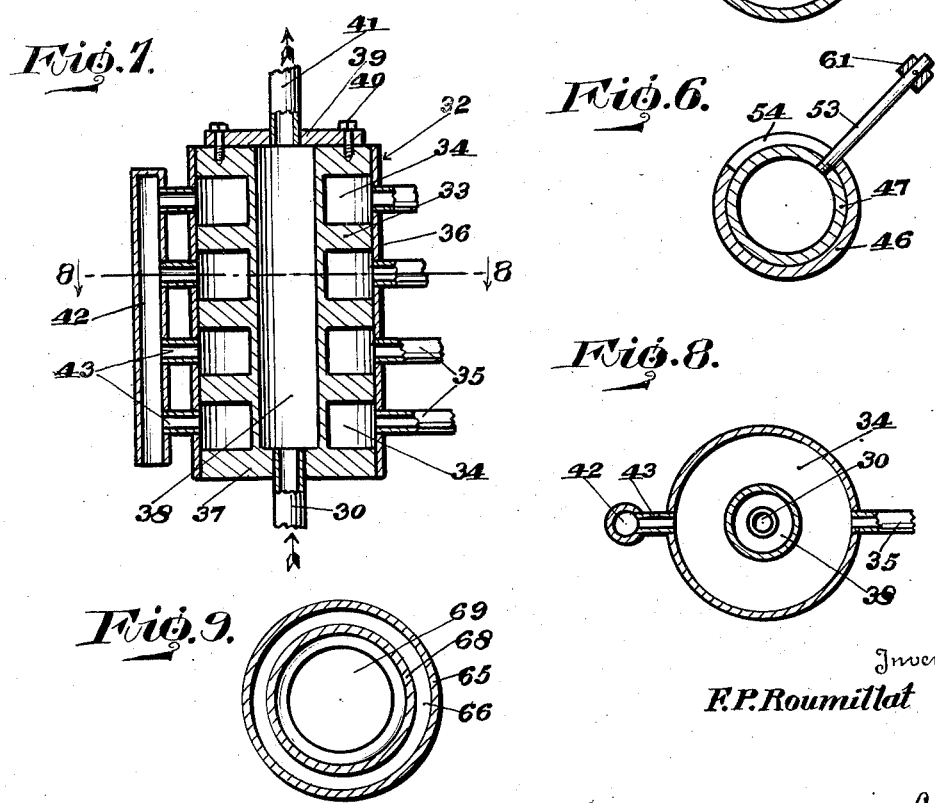

2,119,179

UNITED STATES PATENT OFFICE 2,119,179

CHARGE-FORMING DEVICE FOR INTERNAL COMBUSTION ENGINES

Forest Pius Roumillat, Jacksonville, Fla.

Application May 21, 1937, Serial No. 144,046

6 Claims. (Cl. 123—133)

This invention relates to a charge-forming device for internal combustion engines.

An object of the invention is the provision of a charge-forming device for internal combustion engines for converting heavy fuel into a state where it may be utilized for combustion purposes in an internal combustion engine in which the heavy fuel is vaporized in a primary vaporizer and then further vaporized in a secondary vaporizer after which the vapors are admitted to a rotary valve and supplied to the intake manifold of the engine, means being employed for draining the valve of condensed fuel and for conducting the fuel to the source of supply.

Another object of the invention is the provision of a device for converting heavy fuel into a state where it may be readily burned in the internal combustion chambers of an internal combustion engine, the fuel being vaporized in two stages and conducted to a hollow valve where it is discharged into the intake manifold of the engine in connection with heated air, means being employed for conducting condensed fuel away from the valve and to the source, the first stage heater being located in an expanded part of the exhaust pipe and providing a chamber therein in which the walls of the chamber are supported by hollow stay bolts which form an inlet and an outlet for the fuel being conducted to and from the chamber.

A further object of the invention is the provision of a charge-forming device for heating a heavy oil in a plurality of stages, so that the heavy oil will be converted into vapor form for combustion in connection with heated air in the combustion chambers of an internal combustion engine, a hollow cylindrical valve being employed for controlling the flow of the vapors to the intake manifold and also controlling the return of the condensed vapors to the source, the valve being so constructed that when a port is open for supplying vapors to the intake manifold, the port for discharging condensed fuel being closed, and vice versa.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a view in elevation of an internal combustion engine showing my invention applied thereto.

Figure 2 is a vertical section of the primer heater for heavy fuel.

Figure 3 is a horizontal section taken along the line 3—3 of Fig. 2.

Figure 4 is a vertical section through the intake manifold and air heater.

Figure 5 is a horizontal section taken along the line 5—5 of Fig. 4.

Figure 6 is a horizontal section taken along the line 6—6 of Fig. 4.

Figure 7 is a vertical section of the secondary heater for heavy fuel.

Figure 8 is a horizontal section taken along the line 8—8 of Fig. 7.

Figure 9 is a transverse vertical section taken along the line 9—9 of Fig. 4.

Referring more particularly to the drawings 10 generally designates an internal combustion engine having any number of cylinders, and this engine is provided with the usual exhaust manifold 11 and an intake manifold 12. Extending from the exhaust manifold is an exhaust pipe 13. An intake pipe 14 is connected with the manifold 12 and a carburetor 15. The usual mixing chamber generally designated by the numeral 16 is located between the carburetor and the intake pipe.

It will be noted from Figs. 1 to 3 inclusive that the exhaust pipe 13 is expanded at 20 and a heating chamber 21 is located within the expanded portion and has its walls spaced from the walls of said expanded portion so that the exhaust gases from the manifold 11 may pass all around the walls of the heating chamber. The walls of the said heating chamber are formed of copper so that the heat from the exhaust gases may readily heat the interior of the chamber 21.

A pair of stay-bolts 22 and 23 are connected between the walls of the chamber 21 and the expanded walls 20 of the exhaust pipe 13. These bolts are hollow and provide conduits for conducting fuel to the lower end of the chamber 21 and for conducting vapors away from the upper end of said chambers.

A pipe 24 is connected at 25 with the hollow bolt 23 at one end and the other end of this pipe is connected with a vacuum tank 26, which is located sufficiently above the chamber 21 so that fuel in the vacuum tank will fall by gravity and enter the heating chamber.

A supply tank 27 is connected by a pipe 28 with the upper end of the vacuum tank 26 and a valve 29 controls the flow of the heavy fuel from the tank 27 to the tank 26. Since the tank 26 is under a suction pressure from the intake manifold the fuel will be drawn from the tank 27 into the tank 26. The connection between the tank and the intake manifold 27 is not shown.

A pipe 30 is connected at 31 with the bolt 22 and this pipe extends to the bottom of a second heater generally designated by the numeral 32. This heater consists of a solid casting 33 formed of copper, and at its periphery the casting is provided with a plurality of annular chambers 34 to receive the exhaust gases from the pipes 35. A copper shell 36 is sweated on to the casting 33 for sealing the chambers 34 from the atmosphere. The pipe 30, as shown in Fig. 7 enters the bottom 37 of the casting 33 and is in open communication with a cylindrical chamber 38 formed axially of the casting. A top plate 39 is bolted at 40 to the upper end of the casting and closes the chamber 38. A pipe 41 is connected with the plate 39 and is in open communication with the longitudinal chamber 38.

A discharge pipe 42 is connected by a plurality of short pipes 43 with the annular chambers 34 for conducting the exhaust gases away from said chambers.

The pipe 41 is extended to the bottom 45 of a valve casing 46 and this pipe is in open communication with a hollow rotary valve 47. This rotary valve is provided with an outlet port 48 and which is adapted to be alined with a pipe 50 and connects the casing 46 with the intake pipe 14. The valve is also provided with a port 51 which is adapted to be alined with the inner end of a pipe 52 which terminates in the wall of the valve casing 46. It will be seen by this construction that when the port 48 is alined with the pipe 50, the drain port 51 is out of alinement with the pipe 52 for a purpose which will be presently explained.

A stem 53 is connected with the rotary valve and radially of said valve and extends through a slot 54 in the casing 46 so that when the stem is rocked the valve will be rotated. When the stem, as shown in Fig. 4, is at one end of the slot the outlet port 48 is in alinement with the pipe 50. When the stem is in the opposite end of the slot the port 51 will be alined with the drain pipe 52. The pipe 41 however is always in communication with the lower open end of the valve 47.

A butter-fly valve 55 is connected to a shaft 56 and an operating rod 57 is connected with a crank 58 which is secured to the shaft 56. A link 59 having a turn-buckle 60 therein is connected with an arm 61 which in turn is connected to the stem 53. Thus it will be seen that manual operation of the rod 57 will cause rocking of the shaft 56 and opening of the valve 55 simultaneously with the alining of the port 48 with the outer end of the pipe 50.

The usual carburetor is provided with a valve 62 operated by means of a crank 63 and a rod 64 which extends either to the dash or to the steering column of the vehicle. This valve however is normally kept closed when the engine is operating on the heavy fuel and is only used when the engine is started and a light fuel is supplied (not shown) to the carburetor for the purpose.

An air intake is shown at 65 and is provided with a circular heating chamber 66 into which exhaust gases are discharged by means of a pipe 42a from the secondary heater 32. These gases are discharged from the heater by means of the pipe 67 to the atmosphere. It will be noted that the inner wall of the air intake 65 is corrugated as shown at 68 to increase the heating surface of the intake so that when the air enters the open end 69 of the intake 65 it will be sufficiently heated to cooperate with the heavy fuel vapors which enter the intake pipe 14 for properly operating the internal combustion engine.

A needle valve 70 is located in the pipe 24 and is adapted to control the flow of the fuel from the vacuum tank 26 to the heating chamber 21.

The operation of my device is as follows. The engine is started on gasoline and as soon as the engine is sufficiently heated the heavy oil is turned on through valve 70 and permitted to flow to the primary heating chamber 21 and the vapors and some of the fuel are carried over to the secondary heater 32 where the fuel is completely vaporized and these vaporized fuels are conducted by means of the pipe 41 to the bottom of the valve 47. When the rod 57 is reciprocated the butter-fly valve 55 is opened and the port 48 is alined with the pipe 50 so that these vapors may be supplied to the intake pipe 14. At this time the gasoline is cut off from the carburetor. Then the air which enters the pipe 65 is heated and is mixed with the heavy vapors in the mixing chamber 16.

Some of the vapor will condense and fall to the bottom of the valve 47 and when the valve is moved so that the port 51 will align with the pipe 52 the condensed fuel will then be returned by the said pipe to the source of supply or the tank 27.

The pipes 35 as shown in Fig. 1, conduct the hot exhaust gases from points adjacent the cylinders to the annular chambers 34 in the casting 33. Since these elements are formed of copper, the heat will be radiated to the fuel vapors passing through the central chamber 28 and said vapors will be completely vaporized and be put in such condition that such vapors may be efficiently utilized in the combustion chambers of the engine for the efficient operation of said engine.

I claim:

1. In an internal combustion engine having an intake manifold and an exhaust manifold, a charge-forming device for said engine, a valve casing having an outlet port, and a drain port, a pipe connecting the outlet port with the intake manifold, a chamber heated by the exhaust gases, a second heating chamber, a pipe connecting the two heating chambers, means including a source of fuel for supplying the first chamber with a heavy fuel, a hollow rotary valve in the casing, a pipe placing the valve in communication with the second heating chamber, said valve having ports for alternately alining with the outlet and drain ports, a pipe for conducting condensed vapors from the valve and connected between the drain port and the source of fuel.

2. In an internal combustion engine having an intake manifold and an exhaust pipe, a charge-forming device comprising a heating chamber within the exhaust pipe, hollow stay bolts supporting the chamber in spaced relation with inner walls of the pipe, a source of heavy fuel, means connected between the source and one of the stay bolts for conducting fuel to the chamber, a second heating chamber, the chambers cooperating to convert the fuel into vapors, means conducting the heated fuel from the first chamber through the other stay bolt to the second chamber, means conducting the fuel vapors from the second chamber to the intake manifold, and a pipe for supplying air to said manifold.

3. In an internal combustion engine having an intake manifold and an exhaust pipe, a charge-forming device comprising a heating chamber within the exhaust pipe, hollow stay bolts supporting the chamber in spaced relation with inner walls of the pipe, a source of heavy fuel, means connected between the source and one of the stay bolts for conducting fuel to the chamber, a second heating chamber, the chambers cooperating to convert the fuel into vapors, means conducting the heated fuel from the first chamber through the other stay bolt to the second chamber, means conducting the fuel vapors from the second chamber to the intake manifold, a pipe for supplying air to said manifold, and means included in the last mentioned conducting means for controlling the flow of the fuel to the manifold and for causing condensed fuel vapors to be returned to the source.

4. In an internal combustion engine having an intake manifold and an exhaust pipe, a charge-forming device comprising a heating chamber within the exhaust pipe, hollow stay bolts supporting the chamber in spaced relation with inner walls of the pipe, a source of heavy fuel, means connected between the source and one of the stay bolts for conducting fuel to the chamber, a second heating chamber, the chambers cooperating to convert the fuel into vapors, means conducting the heated fuel from the first chamber through the other stay bolt to the second chamber, means conducting the fuel vapors from the second chamber to the intake manifold, a pipe for supplying air to said manifold, a casing included in the last mentioned means and provided with a connection to the source of fuel, a valve in the casing for controlling the admission of fuel to said manifold, and the return of condensed fuel vapors to the source.

5. In an internal combustion engine having an intake manifold and an exhaust pipe, a charge-forming device comprising a heating chamber within the exhaust pipe, hollow stay bolts supporting the chamber in spaced relation with inner walls of the pipe, a source of heavy fuel, means connected between the source and one of the stay bolts for conducting fuel to the chamber, a second heating chamber, the chambers cooperating to convert the fuel into vapors, means conducting the heated fuel from the first chamber through the other stay bolt to the second chamber, means conducting the fuel vapors from the second chamber to the intake manifold, a pipe for supplying air to said manifold, a valve for controlling the admission of the air to said manifold, a valve in the last mentioned conducting means for controlling the admission of the fuel vapors to the manifold, and means connecting the valves for simultaneous operation.

6. In an internal combustion engine having an intake manifold and an exhaust pipe, a charge-forming device comprising a heating chamber within the exhaust pipe, hollow stay bolts supporting the chamber in spaced relation with inner walls of the pipe, a source of heavy fuel, means connected between the source and one of the stay bolts for conducting fuel to the chamber, a second heating chamber, the chambers cooperating to convert the fuel into vapors, means conducting the heated fuel from the first chamber through the other stay bolt to the second chamber, means conducting the fuel vapors from the second chamber to the intake manifold, a pipe for supplying air to said manifold, a casing included in the last mentioned means and provided with a connection to the source of fuel, a valve in the casing for controlling the admission of fuel to said manifold, and the return of condensed fuel vapors to the source, the first-mentioned valve being so constructed that when fuel is cut off from the manifold the condensed fuel is returned in the source.

FOREST P. ROUMILLAT.